Patented Dec. 8, 1936

2,063,365

UNITED STATES PATENT OFFICE 2,063,365

PROCESS FOR MANUFACTURING MONOCARBOXYLIC ACIDS

Courtney Conover, St. Louis, Mo., assignor to Monsanto Chemical Company, St. Louis, Mo., a corporation of Delaware No Drawing. Application May 1, 1933, Serial No. 668,811. In Canada July 29, 1929

13 Claims. (Cl. 260—108)

This invention relates to the decarboxylation of polycarboxylic acids; the present application being a continuation in part of my co-pending applications Serial Numbers 286,487 and 407,577, filed June 18, 1928 and November 15, 1929, respectively, now United States Patents Numbers 1,942,389 and 1,942,390, respectively.

One object of the present invention is to provide a novel, effective catalytic composition for the decarboxylation of polycarboxylic acids or their anhydrides. Another object of the invention resides in a novel method of effecting the decarboxylation whereby good yields of the desired product are obtainable without the use of expensive equipment or recourse to objectionable or difficult operating conditions. These, together with other objects, will be apparent from the following description of several embodiments of the principles of my invention.

Heretofore it has been proposed to prepare benzoic acid by contacting vapors of phthalic anhydride and steam with a decarboxylating catalytic composition. It has likewise been proposed to heat phthalic acid at super-atmospheric pressure and in the presence of a variety of catalytic compositions.

I have found that chromium compounds, particularly chromium hydroxide, chromium salts of organic acids, and alkali metal chromates, possess an inordinate degree of activity for the decarboxylation of polycarboxylic acids. I have likewise found that the activity is increased in substantial excess of their additional catalytic effect if one incorporates salts or basic compounds of heavy metals capable of forming phthalic acid salts, including copper, nickel, cobalt and silver; and further, that the presence of alkali metal compounds, preferably added in the form of hydroxides, carbonates, or salts of organic acids, impart a further substantial increase in activity to the chromium containing catalyst. These catalysts are useful whether the decarboxylation be effected in vapor phase, in aqueous solution under super-atmospheric pressure, or in a molten phase and at atmospheric or super-atmospheric pressures.

I have likewise found that my catalytic compositions are not only effective in the conversion of phthalic acid to benzoic acid, but may be employed advantageously in the decarboxylation of other polycarboxylic acids, including succinic acid, maleic acid, fumaric acid, chlorophthalic acid, etc. Although the catalytic compositions may be used advantageously in the decarboxylation of a polycarboxylic acid in vapor phase or in solution under super-atmospheric pressure conditions, I have found that the reaction may be effected if the polycarboxylic acid or anhydride is in a molten state, preferably by introducing water or steam into the mass while maintaining an elevated temperature.

The following specific examples will serve to illustrate embodiments of my invention:

Example I.—One hundred (100) parts of phthalic anhydride are charged into a covered vessel provided with an agitating mechanism to which there is added a catalyst consisting of three parts of chromium phthalate and 2.35 parts of di-sodium phthalate. The chromium phthalate may be made conveniently by causing chromium hydroxide to react with phthalic acid in the presence of a small amount of water. It is unnecessary to isolate the reaction product and in fact the chromium hydroxide may be added directly to the reaction vessel containing the phthalic anhydride. Similarly, in lieu of the sodium phthalate, one may add one mol. equivalent of caustic soda or soda ash to the reaction vessel.

The charge is heated until it reaches a temperature of approximately 200° C. Water is thereafter admitted to the reaction mixture either as such or in the form of steam, the point of introduction being preferably below the surface of the mixture. The rate of introduction may be varied. However, it has been found that a rate of 2 to 20 parts per hour for each 100 parts of phthalic acid is effective. The mixture is agitated during the course of the reaction and the reaction is allowed to proceed until the mixture contains 5% or less of phthalic anhydride or phthalic acid. Thereafter the benzoic acid is separated from the reaction mixture in any suitable way, as, for example, by distillation with or without the aid of steam.

A more complete separation of the benzoic acid from the unreacted phthalic anhydride or phthalic acid may be obtained by adding enough soda ash, lime, or other alkali or alkaline earth metal compound to the mixture to combine and thereby fix the phthalic acid or anhydride. The catalyst contained in the residue may be used again in succeeding batches and eventually may be recovered advantageously by dissolving the residue in a solution of soda ash. The metal precipitate may be separated by filtration or decantation after which it is charged again into the reaction kettle for subsequent use.

The preferred temperture range extends from 200 to 250° C. At 220° C. the reaction progresses rapidly and smoothly. Moreover, at this temperature the reacting conditions are not difficult to maintain.

*Example II.*—Another catalyst which I have discovered gives even better results than the catalysts above described, consists of a mixture containing 4 parts of sodium dichromate, 1 part nickel carbonate and 0.25 parts cupric carbonate for each 100 parts of phthalic anhydride employed in the reaction batch. If desired, chromic hydroxide mixed with sodium or potassium hydroxide may be used in place of the sodium dichromate in the mixture just referred to.

While water in the form of steam is preferred in conducting the reaction, I wish it to be understood that it is immaterial in what form the water is used.

The water which undergoes reaction may be introduced into the reaction zone in the form of a liquid, vapor, a component of the catalyst, or it may have its origin in a chemically combined form such as phthalic acid. In its broad sense, therefore, the term "water" is to be understood as contemplating water of varied origin including liquid water, steam, as well as water which is combined, that is, water which may be liberated or otherwise rendered available under the conditions of the reaction. Thus, for example, the acid may supply its own water for the reaction.

The reaction in the case of phthalic anhydride may be represented as follows:

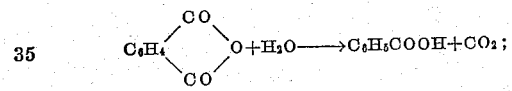

whereas in the case of phthalic acid it may be represented:

In other respects the reaction is conducted in a manner similar to that described in Example I.

*Example III.*—Chloro-benzoic acid is obtained by proceeding as described in the foregoing examples by substituting chloro-phthalic acid or chloro-phthalic anhydride for the phthalic acid or phthalic anhydride provided for in the foregoing examples.

*Example IV.*—In lieu of the phthalic anhydride provided for in Examples I and II, substitute a mol equivalent of succinic acid or anhydride, otherwise proceed as described. Obviously, a chromium succinate catalyst is to be preferred in lieu of a chromium phthalate catalyst. The propionic acid thus obtained is condensed from the vapors evolved from the reaction mixture and may be refined by well known methods, as by fractional distillation.

*Example V.*—The value of chromium as a catalyst is not restricted to the conditions set forth in the foregoing examples. Thus, one may obtain benzoic acid, for example, by mixing mol equivalents of chromium hydroxide and phthalic acid in the presence of water and subsequently evaporating the mixture slowly and continuing the application of heat after the reaction mixture is apparently dry. Benzoic acid sublimes from the mixture. The presence of small amounts of copper or nickel compounds or other similar decarboxylating metal catalysts is beneficial.

*Example VI.*—Chromium may be used advantageously in the vapor phase process as described in my Patent 1,645,180, dated October 11, 1927. For this purpose pellets of chromium oxide alone or in admixture with activating agents such as copper or zinc oxides or hydroxides which may contain an alkali such as sodium carbonate, potassium carbonate, and the like, serve as the catalyst. Diluents, modifying agents and binding agents for the catalyst may be employed as is well understood by those skilled in the art.

A catalyst consisting of 70% chromium hydroxide and 15% soda ash and 15% copper oxide or a mixture of copper and nickel oxides are pelleted and dried, after which a vapor mixture of phthalic anhydride and steam is conducted over the catalyst while maintaining a temperature from 250° to 550° C.

*Example VII.*—An autoclave is charged with 150 pounds of phthalic anhydride and 200 pounds of water. Ten (10) pounds of catalyst such, for example, as is described in Examples I or II, are added, after which the mixture is heated to 190°–240° C. Carbon dioxide, which is evolved during the reaction, is vented from time to time while maintaining a pressure which will assure the required temperature notwithstanding the large excess of water present. After the evolution of carbon dioxide has subsided, the temperature is reduced and the crude benzoic acid is separated from the reaction mixture as by steam distillation.

What I claim is:

1. The method which consists in subjecting one of the group consisting of a poly-carboxylic acid and a poly-carboxylic anhydride, to the action of a decarboxylating catalyst and water while maintaining the acid or anhydride in a molten condition.

2. The method as defined in claim 1 and further characterized in that the catalyst contains a compound of chromium and a compound of an additional heavy metal which is capable of existing in a combined form as a phthalate.

3. The method which consists in reacting chlorphthalic anhydride while in a molten state, at substantially atmospheric pressure with water in the presence of a decarboxylating catalyst.

4. The method which comprises reacting succinic acid while in a molten state and at substantially atmospheric pressure in the presence of a decarboxylating catalyst and water.

5. The method as defined in claim 1 and further characterized in that the catalyst contains a compound of chromium.

6. The method which consists in reacting succinic anhydride, while in a molten state at substantially atmospheric pressure with water in the presence of a decarboxylating catalyst.

7. A method of preparing monocarboxylic acids which comprises subjecting the corresponding dicarboxylic acid, while in molten state, to the action of a decarboxylating catalyst and water.

8. A method of preparing monocarboxylic acids which comprises subjecting the corresponding dicarboxylic acid anhydride while in molten state to the action of a decarboxylating catalyst and water.

9. A method as defined in claim 7 and further characterized in that the catalyst contains simultaneously compounds of chromium, an alkali metal and a heavy metal, said heavy metal being capable of reacting with phthalic anhydride to form a phthalate.

10. A method as defined in claim 8 and further characterized in that the catalyst contains simultaneously chromium, an alkali metal and a heavy metal, said heavy metal being capable of reacting with phthalic anhydride to form a phthalate.

11. A method as defined in claim 7 and further characterized in that the catalyst contains simultaneously compounds of chromium, an alkali metal and a heavy metal, said heavy metal being selected from a group consisting of copper, nickel, silver and cobalt.

12. A method as defined in claim 8 and further characterized in that the catalyst contains simultaneously compounds of chromium, an alkali metal and a heavy metal, said heavy metal being selected from a group consisting of copper, nickel, silver and cobalt.

13. A method of preparing monocarboxylic acids which comprises subjecting the corresponding dicarboxylic acid while in molten state to the action of a decarboxylating catalyst and water, said catalyst comprising essentially compounds of chromium and an alkali metal.

COURTNEY CONOVER.